March 3, 1964 R. W. JOHNSON 3,123,671
ELECTRONIC CODE TYPEWRITER
Filed April 8, 1960 4 Sheets-Sheet 1

Rodney W. Johnson
INVENTOR.

March 3, 1964  R. W. JOHNSON  3,123,671
ELECTRONIC CODE TYPEWRITER
Filed April 8, 1960  4 Sheets-Sheet 2

| CHR. | LINES (NOT USED) | STOP LINE |
|---|---|---|
| A | 2 | 3 |
| B | 1 | 5 |
| C | 14 | 6 |
| D | 1 | 4 |
| E |  | 1 |
| F | 3 | 5 |
| G | 13 | 5 |
| H |  | 4 |
| I |  | 2 |
| J | 246 | 7 |
| K | 14 | 5 |
| L | 2 | 5 |
| M | 13 | 4 |
| N | 1 | 3 |
| O | 135 | 6 |
| P | 24 | 6 |
| Q | 136 | 7 |
| R | 2 | 4 |
| S |  | 3 |
| T | 1 | 2 |
| U | 3 | 4 |
| V | 4 | 5 |
| W | 24 | 5 |
| X | 15 | 6 |
| Y | 1A6 | 7 |
| Z | 13 | 6 |
| 1 | 2468 | 9 |
| 2 | 357 | 8 |
| 3 | 4 | 7 |
| 4 | 5 | 6 |
| 5 |  | 5 |
| 6 | 1 | 6 |
| 7 | 13 | 7 |
| 8 | 135 | 8 |
| 9 | 1357 | 9 |
| 0 | 13579 | 10 |
| $\overline{AR}$ | 25 | 7 |
| $\overline{BT}$ | 16 | 7 |
| $\overline{AS}$ | 2 | 6 |
| $\overline{SK}$ | 47 | 8 |
| , | 1379 | 10 |
| . | 258 | 9 |
| ? | 35 | 8 |

Rodney W. Johnson
INVENTOR.
BY *[signatures]*
Attorneys

March 3, 1964   R. W. JOHNSON   3,123,671
ELECTRONIC CODE TYPEWRITER
Filed April 8, 1960   4 Sheets-Sheet 3
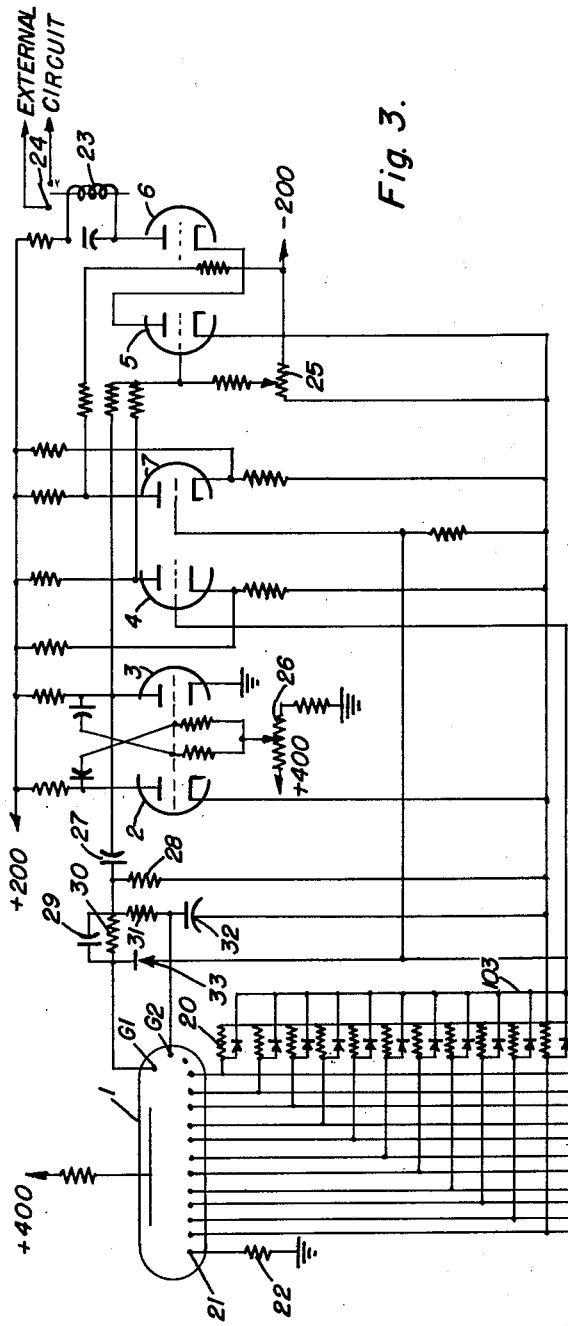
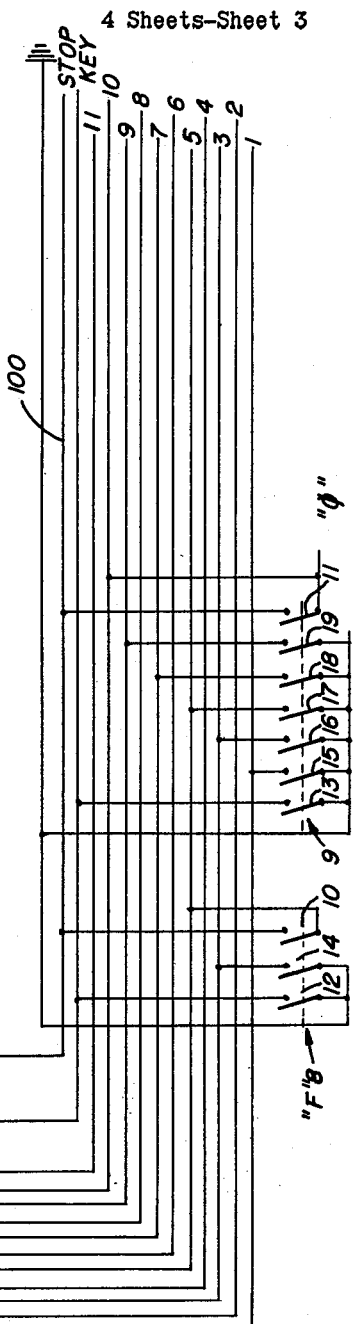
Fig. 3.
INVENTOR.
Rodney W. Johnson
BY
*Attorneys*

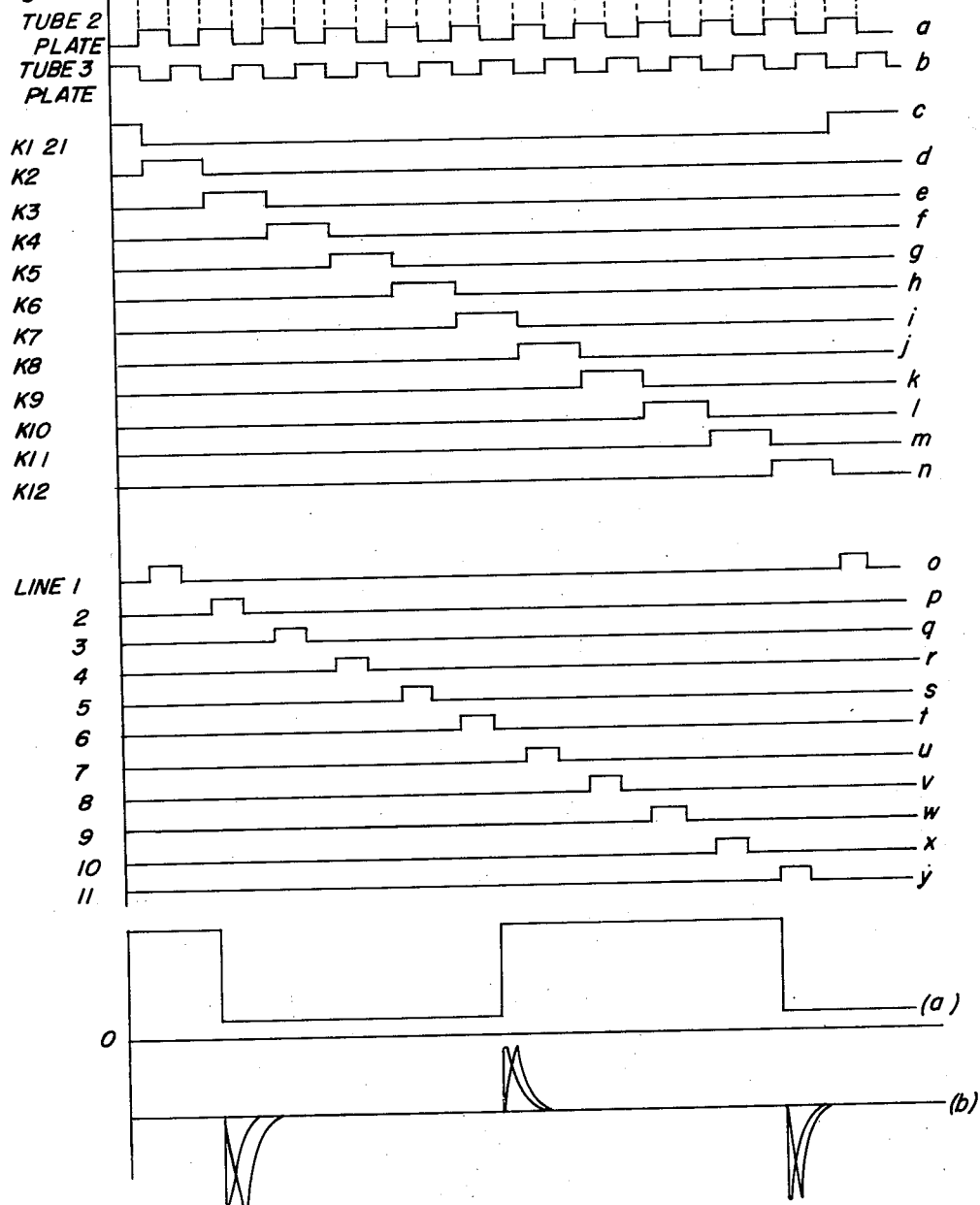

United States Patent Office 3,123,671
Patented Mar. 3, 1964

3,123,671
ELECTRONIC CODE TYPEWRITER
Rodney W. Johnson, 9372 Hillview Road,
Anaheim, Calif.
Filed Apr. 8, 1960, Ser. No. 20,937
12 Claims. (Cl. 178—79)

This invention relates generally to improvements in the code communication art and more particularly to a system and devices for facilitating and improving the quality and ease of code communication.

The advantages of code communication over direct voice communication, particularly with respect to reliability of transmission of intelligence, are well appreciated by those persons skilled in the art. One of the principal factors which have prevented utilization of code communication to its fullest extent has been the erratic production of code characters necessarily implicit in manual sending due to such factors as operator fatigue or lack of skill, and limitations on the speed of transmission, which is generally slower than speeds of reception of which most operators are capable. Additionally, each operator possesses certain personal characteristics in his manual transmission which permit recognition of the operator, such recognition being undesirable in military situations where operator identity should remain unknown.

Numerous automatic systems have been devised from time to time to circumvent the deficiencies in manually-produced code. Because of the fact that the long established International Morse or Continental code has grown in a more or less haphazard fashion not easily compatible with automatic machinery, such automatic systems generally employ special codes, of which the teletypewriter code is an example, which codes are more amenable to automatic reception. These systems, while suitable for machine use, are not interpretable by human intelligence normally restricted to or conditioned for receiving International Morse code. Therefore, when such machines break down or for other reasons are inoperative, it is impossible for most operators to interpret the signals being transmitted and decode these signals.

Automatic systems have also been devised for coding intelligence in the International Morse or Continental code by means of a keyboard, suitably connected to an electromechanical device in such a way as to cause holes to be punched in a paper tape, which tape is later caused to be transported through a suitable set of contacts or a series of light beams, in such a way as to operate relays and produce the desired code character. An example of such a device is the Wheatstone perforator. These tape machines, however, are bulky, expensive, difficult to adjust, require accessories such as tape, and also require that a time delay exist between typing the message and having it transmitted over the communications circuit, this time delay being the amount of time required for the tape to be physically transported from the hole punching mechanism to the scanning or replay apparatus consisting of the previously mentioned contacts or photocells.

Still another automatic system has been devised for production of the International Morse code by means of the keyboard, in this case suitably connected to an electronic device which, by means of electron tubes, causes a series of dots and dashes to be generated as voltage changes in the tube circuits, which voltage changes are then caused to operate an electromechanical device such as a relay, producing the pulse train corresponding to the particular letter, or symbol desired, as closures of the relay contacts. Attention is called to U.S. Patent No. 2,662,112 wherein an electronic system of this character is described. The invention disclosed herein has a basic similarity of purpose to the system described in the above patent but significant differences are to be noted in the invention herein which reduces considerably the complexity, expense and unreliability of such previously patented systems. For example, prior art systems, as disclosed in the aforementioned patent, are based on a sequence of electronic devices, each one triggering the other in chain fashion, and in the particular embodiments specifically described in the patent, a series of gating circuits are provided to control whether each pulse generated is of dot (and space) length, or of dash length. Second, the patented system takes into account the variable total duration between the various characters of the code by triggering the pulse generating chain at a variable point depending on the length of the code group to be generated, so that all code groups will end at the same point in the electronic circuit. While it is logical to organize the code groups in the aforementioned fashion, it is not at all apparent that there exists any other principle by means of which the desired code groups can be generated electronically without having to reckon with the fact that some pulses must be of dot length and others must be of dash length.

Nevertheless, the invention herein adopts a different basic principle which permits the substantial simplification of the means for generating the desired code groups as a result of switching action effected by the pressing of keys on a keyboard. It is herein recognized that regardless of the letter, number or symbol being generated in the International Morse code, the space intervals occur only at odd intervals of time, and never at even intervals of time. By recognizing this basic characteristic of the International Morse code and other code systems, it is possible to substantially simplify the apparatus for sending and receiving code signals by merely making use of code spacing signals as distinguished from code marking signals.

In accordance with the above, it is the principal object of this invention to provide a novel and improved electronic code typewriter system which introduces a novel concept in code transmission which enables the system apparatus to be reduced in complexity and cost. Moreover, the reduction in complexity of the required apparatus eliminates costly maintenance problems and increases the reliability and durability of the system.

It is a more particular object of this invention to provide a novel electronic code typewriter system wherein intelligence is transmitted by a spacing signal pattern as distinguished from a marking signal pattern. By so operating, the cost of telegraphic code communication may be considerably reduced while the reliability thereof may be increased.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a schematic diagram showing the circuitry of a representative embodiment of the invention;

FIGURE 4 is a diagram illustrating waveforms and pulse trains that exist at various points of the circuit of FIGURE 3;

FIGURE 5 is an enlarged diagram of particular waveforms existing at particular points in the circuit of FIGURE 3.

Figure 1:
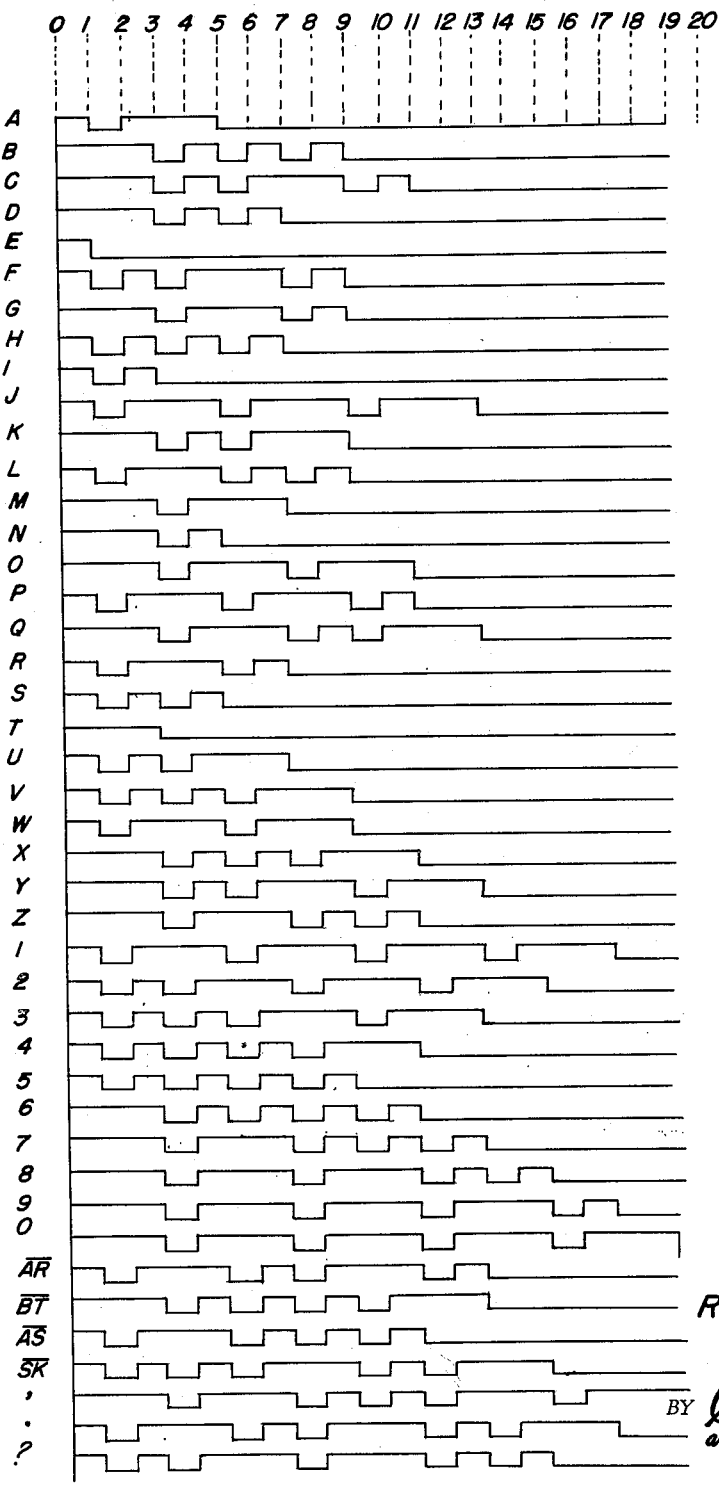
FIGURE 1 is an illustration of the International Morse or Continental code showing the code characters all beginning at the same point in time and showing the language characters corresponding to the code arrangements.

Attention is initially drawn to FIGURE 1 wherein it may be seen that time intervals are identified between numerals starting at a time point indicated by line 0 and continuing up to time line 20. Between each of the time lines is defined a time unit or interval, the interval being designated by the time line at which the interval is initiated. More particularly, the time interval between time line 1 and time line 2 is considered as time interval 1 which is an odd interval. The interval between time lines 2 and 3 is considered interval 2 which is an even interval. Accordingly, the odd intervals of time are shown in FIGURE 1 as intervals 1, 3, 5, 7, 9, etc. The even intervals of time are intervals 2, 4, 6, 8, 10 etc. It will be observed from FIGURE 1 that all space intervals between dots and dashes occur at odd intervals of time. This fact results from the basic standard of Morse code where a dash is three times the duration of a dot and a space is of the same duration as a dot if the length of a dot is assumed to be 1 unit or 1 interval, then a dash is 3 units long and a space is 1 unit long. Since both 1 and 3 are odd numbers, and since either a dot or a dash must be followed by a single space except at the very end of a sequence, it follows that a series of any number M of dots and any number N of dashes must include a total number $(M+N-1)$ spaces therebetween. The total number of time intervals represented by any number of dots and dashes is, therefore, $2(M+2N)-1$, which is necessarily an odd number. Any space, therefore, must necessarily fall at an odd-numbered interval of time. This feature is basic to an understanding of the invention herein, because whereas prior machines of this type operate on the principle of generating the dots or dashes themselves and suitably combining them with spaces, the system herein operates by generating only the spaces at odd intervals of time.

The invention herein provides means for causing relay or other mechanical device or keying circuit to open when a space is generated and otherwise remain closed. This operation is contrary to the methods used in prior art devices, and is the basic factor responsible for substantial simplification of the circuitry, leading to a more practical, reliable, simple device of lower cost and hence wider application than is presently the case.

Figures 2, 6:
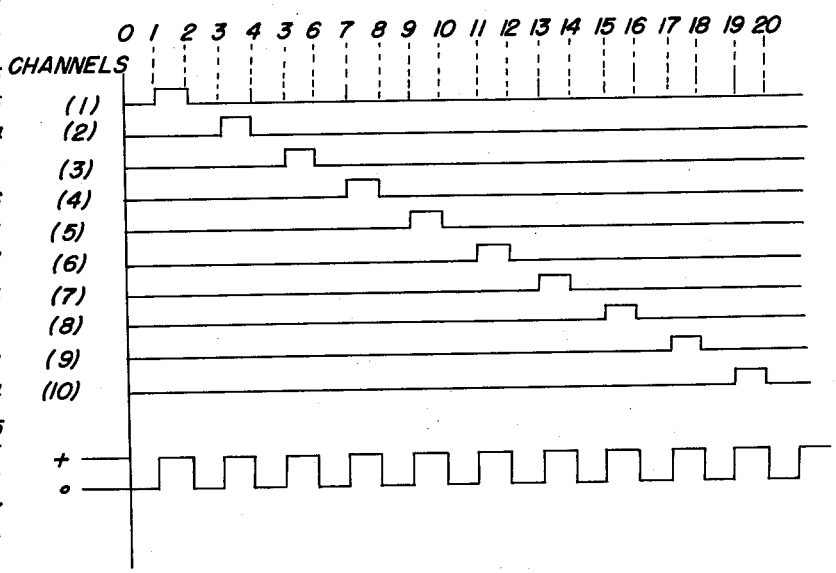
FIGURE 2 is a diagram showing a sequence of pulses generated by the apparatus of the invention.
FIGURE 6 is a chart illustrating the switch connections necessary to produce the International Morse code characteristics when employing the circuit of FIGURE 3.

Prior to proceeding to a discussion of a preferred embodiment of the invention, it should be appreciated that the required pulse train may be generated in a number of different ways, by various code input translators each having certain advantages and disadvantages with respect to cost, speed of operation, complexity, reliability, etc. In order to generate all of the code characters illustrated in FIGURE 1, it is simply necessary to produce a series of spacing pulses in a time sequence such that they occur at odd intervals of time 1, 3, 5, 7, 9, 11, 13, 15 and 17, and a stopping pulse that will terminate operation of the device at any one of these intervals of time or at time interval 19 in FIGURE 1, and to so apply these pulses that they cause to open a relay or other electromechanical device, or turn off a vacuum-tube or semiconductor keying circuit or gate each time they occur, and to provide switch means such that the relay or keying circuit will be closed when any key on the keyboard is depressed, and through which switching means the appropriate selection of spacing and stopping pulses can be achieved. The pulse sequence needed as a basis of selection is illustrated in the lower portion of FIGURE 2. A pulse train is shown including a total of ten pulse channels, equal to the number of odd time intervals in the total of 19 time units available so as to be connected together by a multiple contact switch or other suitable device, such as a diode matrix, in any desired combination so that the required spacing pulses are selected from the ten available channels, and the required stopping pulse is also selected from the ten available channels. It is to be noted from FIGURE 2, and it is readily apparent to those skilled in the art, that these pulse trains are basically a decommutation of an initial pulse train starting at time zero and continuing periodically, as shown at the bottom of FIGURE 2. If each positive pulse of the periodic train at the bottom of FIGURE 2 could be properly identified and selected, then routed to its own particular output circuit, the result would be the time-sequential pulse train illustrated in the upper portion of FIGURE 2. This decommutation of serial to parallel form is basic to a large number of input translators of digital systems, and can be accomplished in many ways, only a few of which are listed below:

(1) Ring or linear counter.
(2) Multiple relays, acting as a linear counter.
(3) Stepping relay.
(4) Combination of flip-flops and diode or other types of gates.
(5) Beam-switching tube.
(6) Cold-cathode decade counter tube.

In order to disclose fully only one preferred translator embodiment, further attention will be paid to the last method indicated, the cold-cathode decade counter tube. It will however be understood that the present invention is not limited to the specific circuits illustrated in the drawings. Many types of decommutating circuits are known, and any circuit capable of producing the required spacing pulses may be successfully employed. Such factors as reliability, complexity and cost are decisive in selection of the particular type of circuit to be used.

The embodiment of the invention to be specifically described employs a sequence storing device for coded intelligence in the form of a decade counter tube of the cold-cathode type, such as is commercially available at nominal cost, and widely used in digital work. This type of tube has a disc-shaped anode, surrounded by a number of pin-like cathodes, and contains a rare gas such as neon. The cathodes are identical physically, but are electrically connected in three groups including two guide pin buses and a cathode pin bus. Conduction occurs in the tube between the anode and the most negative cathode pin, causing a glow on the tip of that pin which permits direct visual read-out, and electrical read-out in the form of voltage developed across a cathode load resistor. In the operation of this type of tube, a negative input pulse is applied to a first of the guide pin buses, which causes the glow discharge to move from a cathode pin (the quiescent position) to the negative guide pin. Near the end of the first pulse in time, a second negative input pulse is applied to the second guide pin bus, making the second guide pin bus now the most negative pin and causing the glow to shift thereto. Since the guide pins are normally positive with respect to the cathode pins, removal of the input pulse of the second guide bus now causes the glow to move to the nearest cathode pin, thus completing one counting cycle, since the glow has transferred from one cathode pin to the next cathode pin around the ring. The next application of a pair of pulses to the guide pins causes the discharge to transfer to the next cathode, and so on around the tube. The transfer action takes place quite rapidly, in a small fraction of a millisecond or less, depending on the particular tube design. It is thus apparent that this tube can successfully be used as a decommutator, with the decommutated outputs taken from each of the ten or more available cathode pins of the tube and may be connected for storage of coded input signals to which the outputs respond.

Particular attention is now called to FIGURE 3 for an explanation of the particular circuitry utilized and the operation thereof. Tube 1 is the conventional decade counter tube whose operation has been described in the preceding paragraph. Tubes 2 and 3 form the basic pulse generator, including a transmission speed controling a multi-vibrator. Tube 4 is a gating signal phase inverter. Tube 5 is a relay AND gate tube connected in series with tube 6 constituting a sequence relay stopping tube. Tube 7 is a phase inverter for the stopping signal. Ganged switch assembly 8 consists of three blade contacts 12, 14 and 10. Switch 8 is a typical switch assembly but corresponds particularly to the International Morse Code characteristics of the letter F. Ganged switch assembly 9 includes blade contacts 13, 15, 16, 17, 18, 19 and 11. Switch 9 is provided with sufficient contacts and is connected so as to correspond to the International Morse code characteristics of the numeral 0. The total number of ganged switches required is, of course, equal to the number of characteristics which appear on the keyboard. The final contacts 10 and 11 of switches 8 and 9 respectively each select the correct cathode pin of tube 1, and are connected to the stopping line designated by the numeral 100. Accordingly, stopping will occur at the correct point for the letters, numerals or symbols to be generated. Initial contacts 12 and 13 of switches 8 and 9 respectively are enabling contacts, each of which starts the chain of events to be described. In the embodiment of the invention illustrated, each of the many switches comprising the keyboard has an initial contact for enabling and a final contact for stopping. In the typical cases for the letter "F" and the numeral "0" shown in FIGURE 3 as switches 8 and 9, additional contacts 14 of switch 8 and 15—19, inclusive, of switch 9 are connected to interrupting circuits to ground the cathode pins of tube 1 which are not to be used to produce space pulses, so that space pulses will appear only on those lines not grounded by these contacts.

Consider now the normal situation with all switches open, corresponding to the condition when no key is depressed on the keyboard. All of the cathode pins of tube 1 to be used have parallel conductive paths through cathode resistors 20 to the key line designated by the numeral 102, except for the rest cathode pin 21. Cathode pin 21 is connected directly to ground through its cathode resistor 22. With no keys depressed on the keyboard, the key line 102 is not connected to ground, so that none of the cathode pins of tube 1 are grounded except cathode pin 21, thus causing the glow discharge to automatically form at this cathode pin when a potential is applied to the tube anode. Also connected to the key line 102 are the cathode and grid returns for relay tube 5, phase inverter tubes 4 and 7, and one of the multi-vibrator tubes, tube 2. When no key is depressed on the keyboard, the relay tube 5 in series with relay stopping tube 6 can draw no current since line 100 is open, and thus the relay 23 remains open or de-energized. Similarly, multi-vibrator tube 2 cannot conduct, so that the multi-vibrator including tubes 2 and 3, cannot oscillate. Multi-vibrator tube 3, however, has its cathode returned to ground, insuring that this tube will be conducting heavily, so that multivibrator action will start up in the correct phase for the proper stepping action to occur once any key is depressed.

When any key is depressed, however, the key line 102 is caused to be connected to ground through contacts such as contact 12 of switch 8 or contact 13 of switch 9, which are enabling contacts, thus completing the cathode circuits of multi-vibrator tube 2, phase inverter tubes 4 and 7, relay tube 5, and all cathode pins of tube 1. At the instant any keyboard switch is depressed, the relay tube 5 also conducts current sufficient to cause relay 23 to be energized, closing contact 24 which energizes the external circuit, this conduction occurring when the bias potential on the grid of tube 5, as established by potentiometer 25 and the plate voltages of tubes 4 and 3, is correct for such conduction. This conducting situation continues until some time later, when an appropriate negative signal appears at the grid of tube 5 by virtue of the combined action of tubes 3 and 4 to generate a space pulse, or when a sufficiently negative signal appears at the grid of tube 6 by virtue of the plate potential of tube 7 to stop a code sequence.

At the instant of closure of the keyboard switch contacts for any switch, the cathode and grid circuit of tube 2 is also connected to ground, causing the multi-vibrator including tubes 2 and 3, and associated components, to commence oscillating in a conventional manner. The frequency of this oscillation and transmission speed is determined by the selective setting of potentiometer 26, being highest when potentiometer 26 is at the positive end of its travel and lowest when at the grounded end of its travel. The multivibrator always starts oscillating in the correct phase, because of the permanently grounded cathode connection of tube 3, and the idealized waveforms at the plates of tubes 2 and 3 are illustrated in FIGURE 4(a) and FIGURE 4(b), in which time zero is the instant of keyboard switch closure. The signal at the plate of tube 3 shown in FIGURE 4(b) is coupled through differentiating pulse shaping components consisting of capacitor 27 and resistor 28 to the two guide pins G1 and G2 of tube 1. Guide pin G1 receives the differentiated signal first in time, because of the action of the high-pass network consisting of capacitor 29 and resistor 30. Guide pin G2 receives a delayed signal because of the integrating action of resistor 31 and capacitor 32. Idealized waveforms to a magnified and exaggerated scale are illustrated in FIGURE 5 where the square wave shown by curve 5(a) represents the waveform at the plate of tube 3, also shown in FIGURE 4(b) and the differentiated waveforms in FIGURE 5(b) are representative of those applied to the guide pins G1, G2, of tube 1. Only the negative signals of FIGURE 5(b) are effective in causing the glow discharge to step around tube 1 in the manner already described, and the positive signals of FIGURE 5(b) may be disregarded as having no effect.

The action of diode 33 is of extreme importance to the operation of the circuitry of FIGURE 3 in providing a gating signal through the phase inverter tube 4, and will now be specifically described. Use of the diode 33 permits stopping of the glow transfer of tube 1 without requiring additional tubes, such as are frequently used with decade counter tubes of the type of tube 1, and is one of many unique and significant features of the invention. Diode 33 is connected between guide pin G1 and some particular cathode pin of tube 1 as selected by switch contact of the keyboard switches, for example, by contact 10 of switch 8 or contact 11 of switch 9, and is of such a polarity that the diode 33 normally conducts during the negative portion of the voltage applied to the guide pin G1, and shown as the earliest pulse of the two pulses of FIGURE 5(b). The connection of diode 33 to a particular cathode pin or tube 1 has negligible effect on the operation of the circuit prior to the time that the glow discharge forms at that particular cathode pin, and the circuit merely causes additional loading of the differentiating network associated with guide pin G1, and drops the voltage slightly over what would exist if diode 33 were not present. Thus, the discharge continues to step around tube 1 under the action of the staggered pulses applied to guide pins G1 and G2 and shown in FIGURE 5(b), until the discharge reaches the cathode pin to which the positive end of the diode 33 is connected. At this time, however, the low voltage drop across diode 33 due to its conduction of the negative stepping pulses prevents any appreciable negative potential difference from existing between guide pin G1 and that particular cathode pin, thus preventing the glow discharge from transferring further, even though the stepping pulses are still being supplied. The discharge therefore remains at the particular cathode chosen for stopping, causing this cathode pin to be positive with respect to ground by virtue of the discharge current flowing through its cathode resistor 20. This positive voltage is applied to the grid of phase inverter tube 7, causing its plate to drop in potential thus cutting off tube 6 and causing relay 23 to open and remain open as long as the keyboard key is depressed.

Reference is again directed to FIGURE 4, at the first negative-going signal at the plate of tube 3, occurring at time interval 1 in FIGURE 4(a), the glow discharge in tube 1 is caused to advance from the rest cathode pin 21 to the next cathode pin, and each succeeding negative-going signal at the plate of tube 3 causes a further stepping to the remaining cathode pins by the action previously described. As the discharge forms at each cathode pin, that cathode pin rises to a positive potential of several volts, due to the flow of discharge current through cathode resistors 20. All cathode pins are connected through diodes 34 to a common bus 103 a signal storing circuit leading to the grid of tube 4. The grid of tube 4 is thus made positive with respect to ground except for those cathode pins which are grounded by the particular switch depressed, as for example switch 8 corresponding to the letter "F," in which contact 14 shorts the fourth cathode pin, connected to line 3 of the crossbar matrix to ground. When the grid of tube 4 is positive with respect to ground, the fixed cathode bias is overcome, causing tube 4 to conduct to provide a gating signal by lowering its plate potential. This lowered potential is insufficient in itself to cause tube 5 to stop conducting, but tube 5 does cease conducting when the plate potential of both tube 4 and tube 3 is low, this occurring at every odd time interval. The idealized waveforms of the cathode pin signals of tube 1 are shown in FIGURE 4(c)–(n) for the particular 12-cathode pin tube utilized in the disclosed embodiment. The portions of the tube 1 cathode signal over which tube 5 is caused to be cut-off by the simultaneous dropping of the potential of the plates of tubes 4 and 3 are indicated in FIGURE 4(o)–(y) which represents the eleven lines (of which only 10 need be used for Morse code signals) corresponding to spaces to be generated. It is thus apparent that the grid of tube 5 acts as an AND gate, to which is applied the multivibrator clock signal appearing at the plate of tube 3, and the suitably inverted cathode gating signals of tube 1, appearing at the plate of tube 4. Both of these signals must be present in order for tube 5 to become non-conducting, and hence, for relay 23 to become de-energized and open contacts 24 to the external circuit. Any time that any cathode pin of tube 1 is shorted to ground so that no voltage may appear across that cathode resistor 20, the plate of tube 4 will not fall to the potential required for operation of the AND gate, so that the relay will remain energized.

Attention is now called to FIGURE 6 wherein a chart shows the various cathode pin lines in FIGURE 3 that must be short-circuited to ground in order to produce the Morse code character listed corresponding to the Morse characteristics of FIGURE 1. The chart in FIGURE 6 also shows the cathode line to which the stopping circuit consisting of the positive side of diode 33 and the grid of tube 7 must be connected in order to terminate the glow transfer around the tube at the correct point to generate the character listed. The number of total switch contacts required is the same as the number of lines that must be shorted to ground, plus one for selection of the stopping line and one for the keying operation or enabling function. It will be appreciated from FIGURE 6, that the maximum number of contacts required for any switch is seven, and this occurs only in one case, that of the numeral "0."

Comparing the chart of FIGURE 6 with the characteristics illustrated in FIGURE 1, the letter "A" will be considered. It will be noted that the characteristics of the letter "A" define a space at time interval 1 which corresponds to channel 1 or cathode pin 1 of FIGURE 3. There is no space at time interval 3 which corresponds to channel 2 or cathode pin line 2 of FIGURE 3. Time interval 5 corresponding to channel 3 or cathode pin line 3 is the stopping space; that is, at time interval 5, the characteristics of the letter "A" have been fully set forth. FIGURE 6 shows that line 2 of FIGURE 3 is not utilized. Therefore, time interval 3 of FIGURE 1 does not have a space generated. Time interval 1 of FIGURE 1 does have the space generated because cathode pin line 1 of FIGURE 3 has not been grounded as has cathode pin line 2 of FIGURE 3, corresponding to time interval 3 of FIGURE 1. Likewise, the connections for each of the characters indicated in FIGURE 6 may be matched versus the characteristics illustrated in FIGURE 1.

It will be apparent to those skilled in the art that multiple contact switches are not essential to the operation of this invention, but that switching can be accomplished electronically by means of diode gates, neon tubes, transistors, or electrically by means of relays. Any form of crossbar matrix that can establish the switching pattern listed in FIGURE 6 may be used. It will also be apparent to those skilled in the art that complementary logic can also be used, whereby only those cathodes whose signals are desired are connected to the grid of tube 4 instead of grounding those cathodes whose signals are not desired; switching of this type requires a greater total number of contacts on the keyboard switches, or a greater number of diodes or other devices.

In summary, it is important to note the advantages introduced by the invention described above over the prior art devices and systems. Initially, it is apparent that only four tube envelopes are required to achieve the objectives of the invention, whereas other inventions require twelve or more tube envelopes. Also, only one adjustment is required in addition to the speed control 26, that being bias potentiometer 25, which takes into account all factors of tolerance, tube characteristic variations and line voltage in the one adjustment, whereas other inventions require potentiometers to adjust each individual dot, dash or space length. Still further, as has been previously mentioned, it is possible using the principle of space generation as opposed to dot-dash generation, to utilize a fast-action stepping relay, suitably driven by a signal source such as the multivibrator 2—3, and eliminate still more tubes from the circuit by means of circuitry well appreciated in the art.

The present invention is not to be deemed limited by the above description, which is solely illustrative, since many other types of circuits may be used in place of those described herein. The basic principle of space generation or space recognition may also be utilized advantageously in automatic Morse code receiving systems or in converters to translate More code into teletype code and vice versa, such systems requiring only digital logic circuits of the type commonly used in digital computers. For example, an automatic Morse code receiving system can be easily constructed by those skilled in the art, by applying well known circuit techniques to recognize the spaces present in the Morse code signals and apply these through a diode matrix to memory devices which will store the unique combination of spaces representing a given character transmitted, and which may be read through a second diode matrix at such time as the letter is complete, to produce a unique output capable of operating a printing device such as an electric typewriter. Such a system would require no analog devices, would not demand that a dot or dash be recognized, and would also lend itself to decoding operations such as are necessary in privacy systems.

Still other applications of the invention will be obvious to those skilled in the art, as a result of the description given. Privacy coding may be easily applied to the generating system by simply reconnecting the cathode pin lines from tube 1 in some different fashion than that described, and making a corresponding reconnection at the output of an automatic receiving system based on the same principle of space generation and space recognition. Such coding may be of a transposition type, where one letter is made to correspond with another, or may be of a type where the signal transmitted is not recognizable as Morse code, consisting of combinations of dashes and dots of varying lengths. Also, the machine may be reconnected so as to use only five of the cathodes of tube 1, without the AND gate provided, in effect, by the grid of tube 5, so as to produce the teleprinter code directly each time the appropriate switch is depressed on the keyboard.

What is claimed as new is as follows:

1. A system for producing code intelligence comprising, code marking means, space generating means operatively connected to said code marking means supplying space generating signals to render said marking means inoperative during spacing intervals between marking intervals of equal duration, code input means operatively connected to said space generating means to render said space generating means operative to produce a sequence of space generating signals during a limited duration of marking and spacing intervals, and signal storing control means operatively connected to the code input means and space generating means for interrupting space generating signals of said sequence to produce equally spaced marking periods extending over different numbers of spacing and marking intervals.

2. The combination of claim 1, wherein said space generating means comprises transmission rate controlling oscillator means for producing a sequence of frequency controlled clock pulses, AND gate means operatively connected to said oscillator means and signal storing control means for receiving said clock pulses and gating signals from the oscillator means and signal storing means respectively to produce a gated output and relay means operatively connected to the AND gate means and code input means to convert said gated output to said space generating signals limited in duration to said sequence by the code input means.

3. The combination of claim 2, wherein said code input means comprises, a plurality of circuit establishing switch means operatively connected to said signal storing control means and oscillator means, code selecting key means operatively connected to said switch means for simultaneous establishment of selected interrupting circuits by the switch means and energization of the oscillator means, and stop phase control means operatively connecting said switch means to said relay means for producing a continuous space generating signal after a delay predetermined by said signal storing control means within said sequence limited duration.

4. The combination of claim 3, wherein said signal storing control means comprises, pulse counter means operatively connected to said AND gate means for supply of said gating signals thereto, pulse shaping means operatively connecting said oscillator means to the pulse counter means for producing said gating signals in phase with said frequency controlled clock pulses to produce said equal spacing and marking intervals, and storing circuit means operatively connecting said pulse counter means to said selected interrupting circuits to control the gating signals.

5. The combination of claim 1, wherein said code input means comprises, a plurality of circuit establishing switch means operatively connected to said signal storing control means and a space generating means, code selecting key means operatively connected to said switch means for simultaneous establishment of selected interrupting circuits by the switch means and energization of the space generating means and stop phase control means operatively connecting said switch means to said space generating means for producing a continuous space generating signal after a delay predetermined by said signal storing control means within said sequence limited duration.

6. The combination of claim 5, wherein said signal storing control means comprises, pulse counter means operatively connected to said space generating means for supply of gating signals thereto, pulse shaping means operatively connecting said space generating means to the pulse counter means for producing said gating signals to produce said equal spacing and marking intervals, and storing circuit means operatively connecting said pulse counter means to said selected interrupting circuits to control the gating signals.

7. The combination of claim 1, wherein said signal storing control means comprises, pulse counter means operatively connected to said space generating means for supply of gating signals thereto, pulse shaping means operatively connecting said space generating means to the pulse counter means for producing said gating signals to produce said equal spacing and marking intervals, and storing circuit means operatively connecting said pulse counter means to selected interrupting circuits of said code input means.

8. The combination of claim 1, wherein said code intelligence consists of dots represented by marking periods of one marking interval and dashes represented by marking periods of one spacing interval and two marking intervals, said marking periods being spaced apart by single spacing intervals.

9. A method for producing code intelligence comprising the steps of: generating a continuous energizing signal converted into a corresponding mark; interrupting said energizing signal by a sequence of spacing signals of constant duration and frequency to define equal marking intervals between spacing intervals; and deleting only certain alternate spacing signals of said sequence in accordance with a selected code to produce spaced marking periods which consist of either one marking interval or include a plurality of bridged marking intervals.

10. A code transmission system comprising, energizing means for intermittently establishing a continuous marking output for a predetermined sequence period, pulse generating means, relay means operatively connected to said energizing means for interrupting the marking output, gate means operatively connecting said pulse generating means to the relay means for producing interruptions of the marking output for equal spacing periods at equal spaced time intervals to define alternate marking periods during said sequence period, and code selecting means operatively connected to the pulse generating means for deleting selected spacing periods to bridge selected marking periods.

11. The combination of claim 10, wherein said code selecting means includes means for producing a sequence terminating pulse, and means operatively connected to the energizing means for terminating the marking signal in response to said sequence terminating pulse.

12. A code transmission system comprising, an output code marking circuit, keying means for intermittently rendering said marking circuit operative to produce a continuous marking signal for a predetermined sequence period, a time regulating oscillator rendered operative to produce output spacing pulses of equal duration at a predetermined frequency, signal storing means connected to said oscillator and rendered operative thereby to dispatch a train of spacing signals simultaneously synchronized with the spacing pulses from the oscillator, gate means connected to the oscillator for passing the output spacing pulses therefrom in response to simultaneous receipt of spacing signals from the signal storing means, relay means operatively connecting said gate means to the keying means for rendering the spacing pulses operative to interrupt the continuous marking signal in the marking circuit producing alternate marking periods and spacing periods, input selecting means responsive to actuation thereof for deleting selected spacing signals in the train of spacing signals stored in the signal storage means to form a coded sequence of spacing signals, means responsive to release of the input selecting means for rendering the storage means operative to dispatch said coded sequence of spacing signals to the gate means to produce a sequence of alternate marking periods and spacing periods in the marking circuit modified by the bridging of selected marking periods.

(References on following page)

References Cited in the file of this patent

UNITED STATES PATENTS

| | | |
|---|---|---|
| 907,604 | Jones | Dec. 22, 1908 |
| 1,805,114 | Tevis | May 12, 1931 |
| 2,083,160 | Finch | Jan. 8, 1937 |
| 2,111,146 | Johnston | Mar. 5, 1938 |
| 2,810,785 | Lee | Oct. 22, 1957 |
| 2,849,654 | Medoff | Aug. 26, 1958 |
| 2,887,617 | Warman | May 19, 1959 |
| 2,953,642 | Zahner | Sept. 20, 1960 |

OTHER REFERENCES

Book, "Telegraphy," by J. W. Freebody, published 1959 by Pitman Press, London, England; page 4.